(No Model.) 7 Sheets—Sheet 1.
J. E. ENNIS.
BUILDER'S SCAFFOLD.

No. 557,501. Patented Mar. 31, 1896.

WITNESSES:
Fred G. Dieterich
M. D. Blondel

INVENTOR
John E. Ennis.
BY
Munn
ATTORNEYS.

(No Model.) 7 Sheets—Sheet 2.
J. E. ENNIS.
BUILDER'S SCAFFOLD.

No. 557,501. Patented Mar. 31, 1896.

WITNESSES:
Fred G. Dieterich
M. D. Blondel

INVENTOR
John E. Ennis.
BY Munn & Co.
ATTORNEYS.

(No Model.) 7 Sheets—Sheet 3.

J. E. ENNIS.
BUILDER'S SCAFFOLD.

No. 557,501. Patented Mar. 31, 1896.

WITNESSES:
Fred G. Dieterich
M. D. Blondel

INVENTOR
John E. Ennis.
BY Munn & Co.
ATTORNEYS.

(No Model.)  
J. E. ENNIS.  
BUILDER'S SCAFFOLD.  
No. 557,501. Patented Mar. 31, 1896.
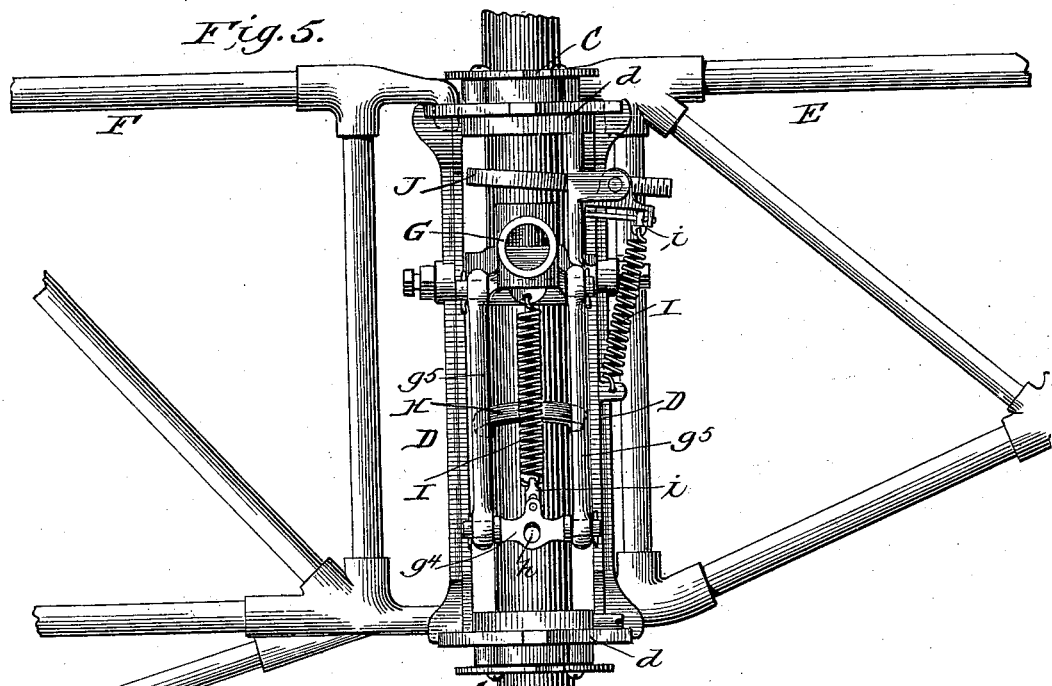
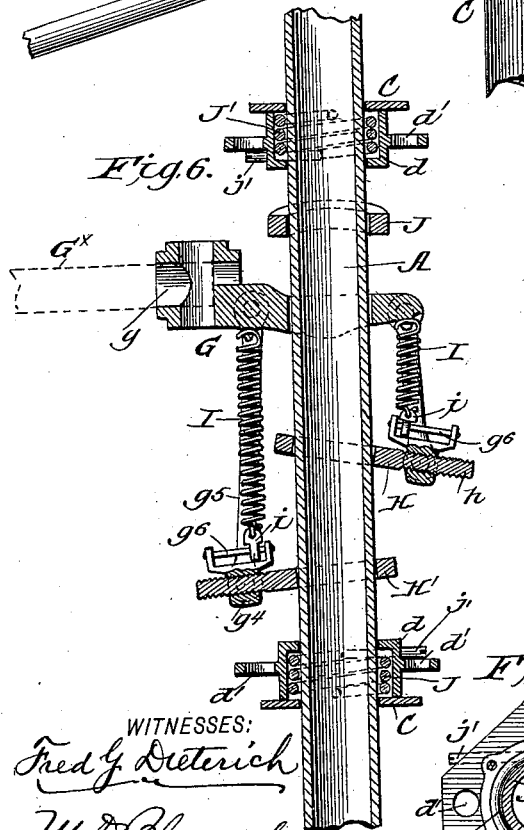
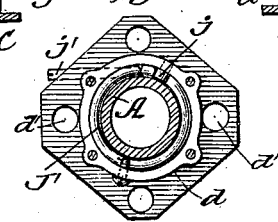
WITNESSES:  
Fred J. Dieterich  
M. D. Blondel  
INVENTOR  
John E. Ennis.  
BY  
ATTORNEYS.

(No Model.) 7 Sheets—Sheet 5.
J. E. ENNIS.
BUILDER'S SCAFFOLD.
No. 557,501. Patented Mar. 31, 1896.
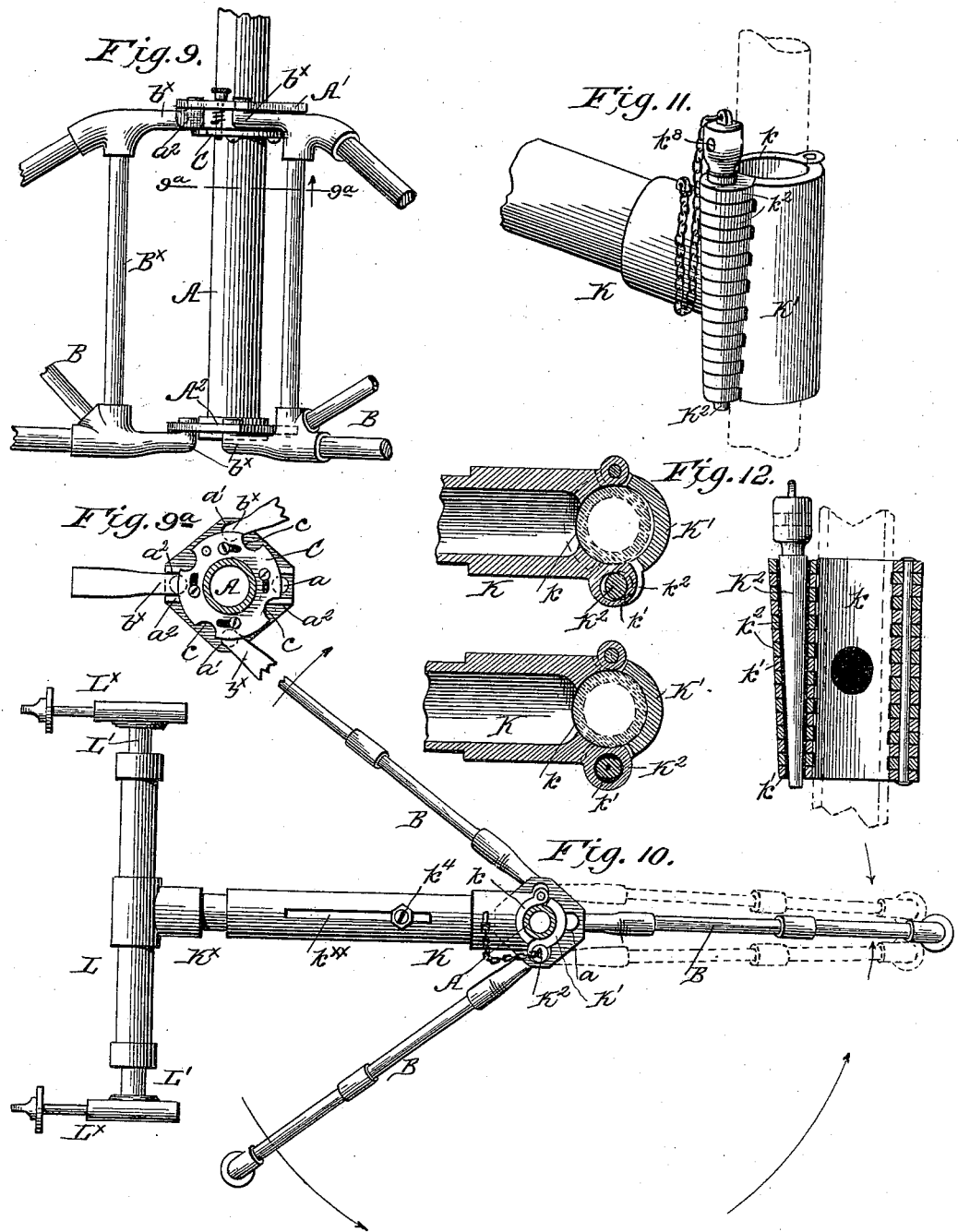
WITNESSES:
Fred G. Dieterich
M. D. Blondel
INVENTOR
John E. Ennis.
BY Munn & Co.
ATTORNEYS.

(No Model.) 7 Sheets—Sheet 6.
J. E. ENNIS.
BUILDER'S SCAFFOLD.
No. 557,501. Patented Mar. 31, 1896.
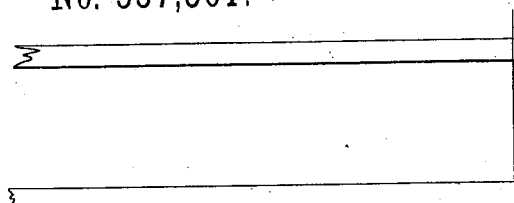
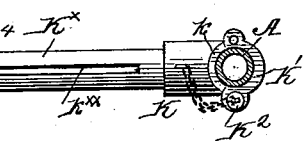
Fig. 13.
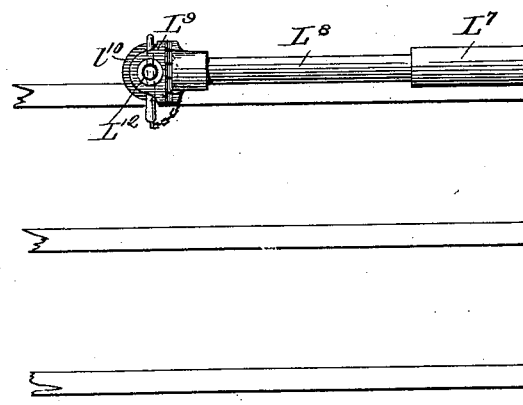
Fig. 14.
Fig. 15.
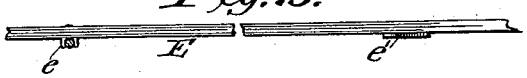
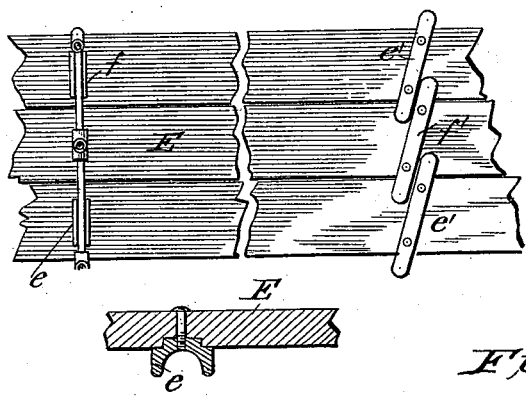
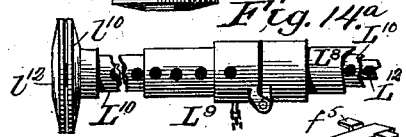
Fig. 14.ª
Fig. 16.
WITNESSES:
Fred G. Dieterich
M. D. Blondel
INVENTOR
John E. Ennis.
BY Munn & Co
ATTORNEYS.

(No Model.) 7 Sheets—Sheet 7.
J. E. ENNIS.
BUILDER'S SCAFFOLD.
No. 557,501. Patented Mar. 31, 1896.
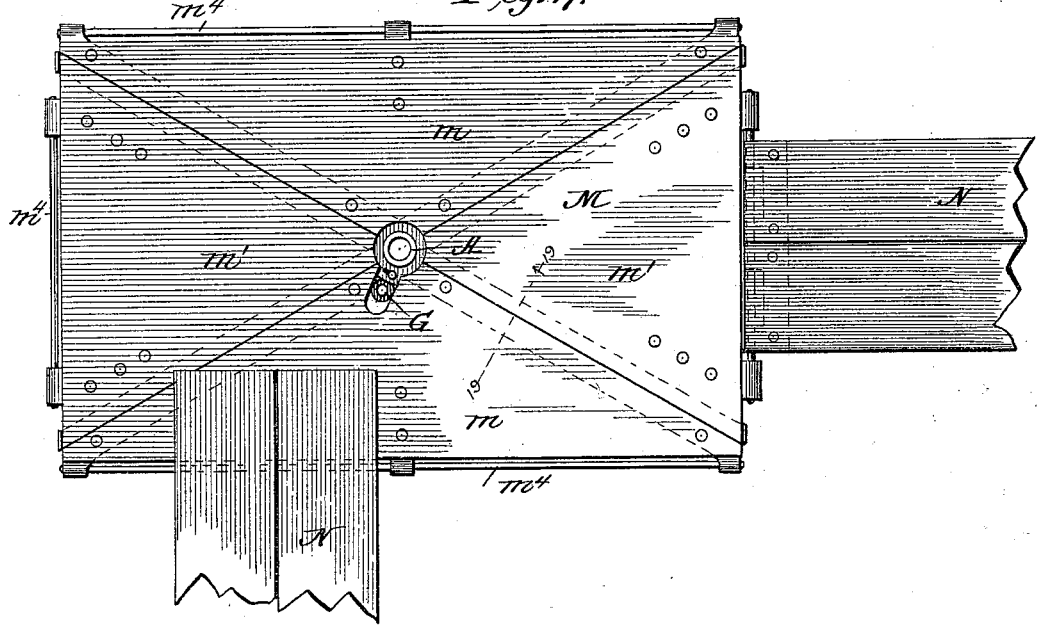
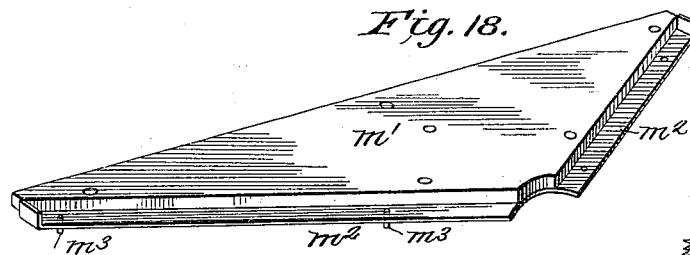
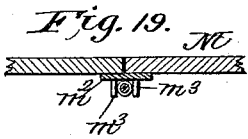
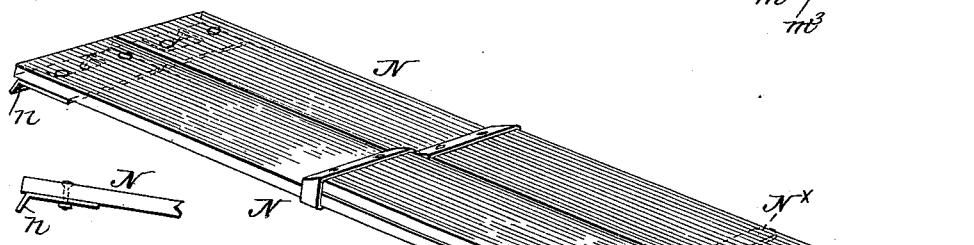
WITNESSES:
Fred G. Dieterich
M. D. Blondel
INVENTOR
John E. Ennis.
BY
ATTORNEYS.

UNITED STATES PATENT OFFICE.

JOHN E. ENNIS, OF DULUTH, MINNESOTA.

BUILDER'S SCAFFOLD.

SPECIFICATION forming part of Letters Patent No. 557,501, dated March 31, 1896.

Application filed September 2, 1892. Serial No. 444,927. (No model.)

*To all whom it may concern:*

Be it known that I, JOHN E. ENNIS, residing at Duluth, in the county of St. Louis and State of Minnesota, have invented certain new and useful Improvements in Builders' Scaffolds, of which the following is a specification.

The object of my invention is to provide scaffold-supporting devices so arranged that the same can be raised or lowered with the load by the operator held thereon, which is capable of use as an inside or outside scaffold, and which can also be used as a window-scaffold for use on buildings where a ground support cannot be conveniently employed.

It has also for its object to provide in connection with such devices a suitably-constructed "runway" or intermediate scaffold, used as a landing or turning station for the barrowman or hod-carrier.

With other minor objects in view, all of which will hereinafter be fully referred to, my invention consists in the peculiar combination and novel arrangement of parts, all of which will be fully described in the specification and pointed out in the claims, reference being had to the accompanying drawings, in which—

Figure 1:
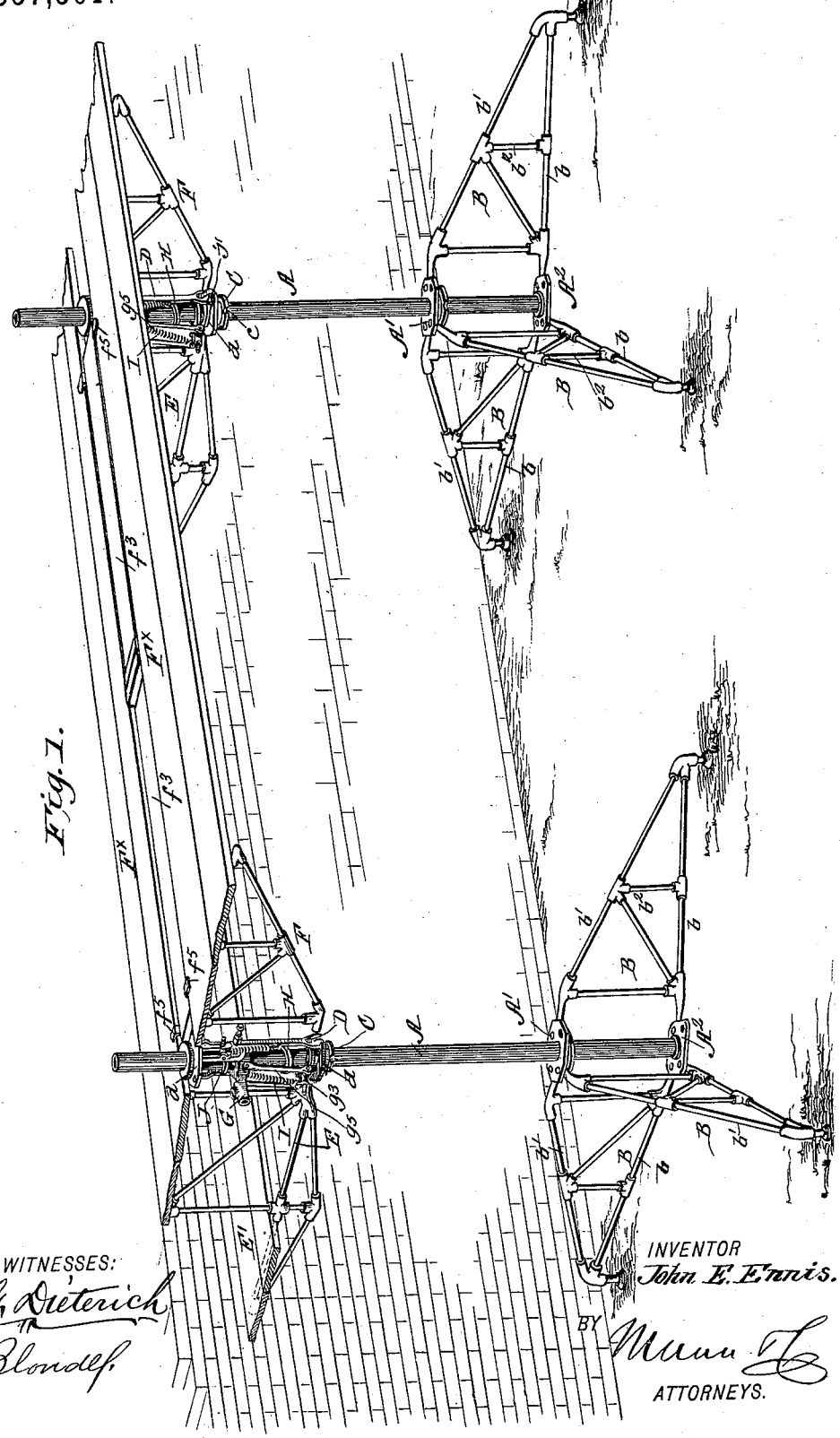
Figure 2:
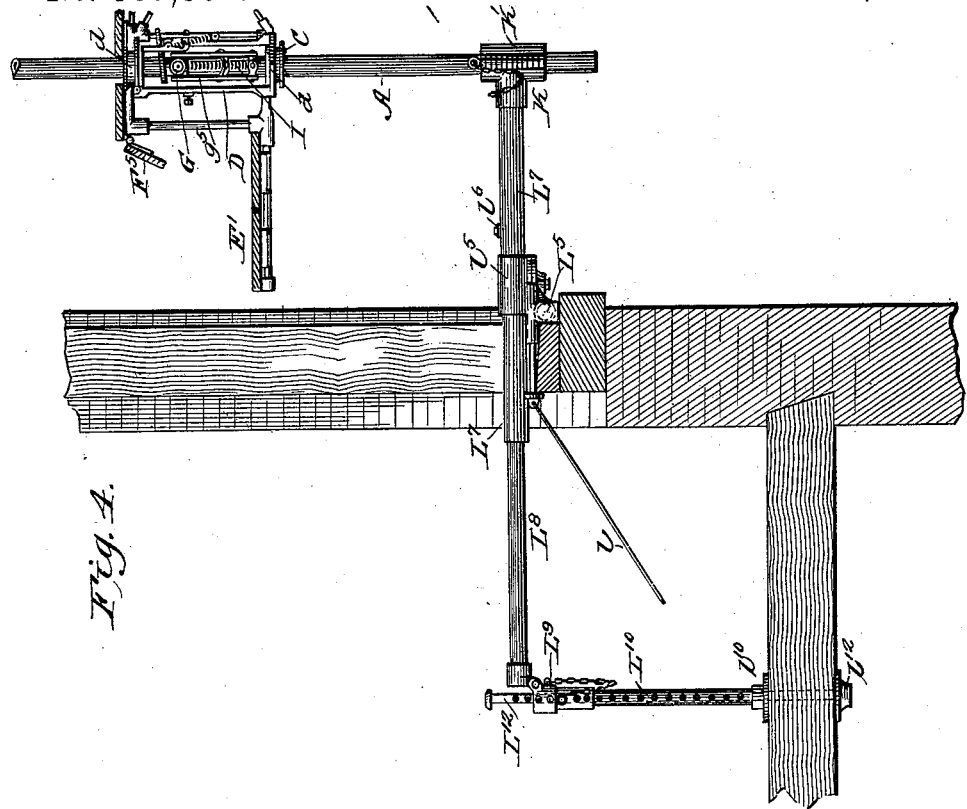
Figure 3:
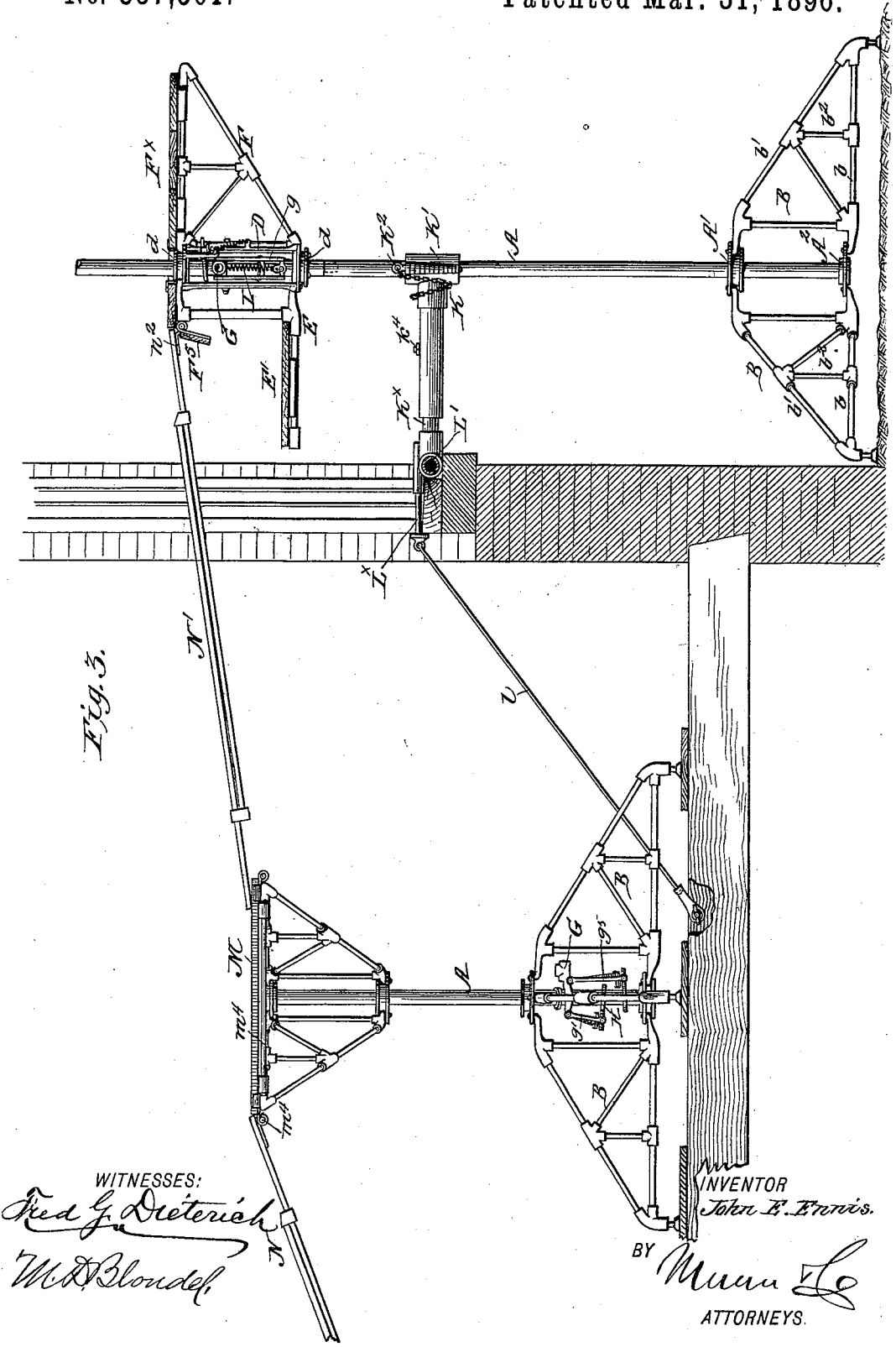

Figure 1 is a perspective view of my improved scaffold, showing the same arranged for use as an inside scaffold, with a wheelbarrow-platform. Fig. 2 is a side view of the same, showing it provided with a supplemental or hod-carrier platform. Fig. 3 is a side elevation showing the same as applied for use as an outside scaffold with a runway used in connection therewith. Fig. 4 is a side elevation, partly in section, illustrating my improved scaffold as applied for use at a point above the first or second stories of a building. Fig. 5 is an enlarged side view of the "clutch elevating" device and the swinging brackets. Fig. 6 is a vertical longitudinal section of the same, showing the clutches adjusted to raise the bracket. Fig. 7 is a similar view showing the clutches adjusted to their lowering position. Fig. 8 is a horizontal section on the line 8 8, Fig. 7. Figs. 9 and $9^a$ are detail views illustrating the manner of connecting the swinging support or base of the standards. Fig. 10 is a plan view of the window-brace bar. Figs. 11 and 12 are views illustrating the clamp for securing such brace-bar to the standard. Figs. 13, 14, and $14^a$ are views illustrating the manner of connecting the modified form of window-brace (shown in Fig. 4) to the joists. Figs. 15 and 16 illustrate the manner of supporting the platform-boards on the brackets. Figs. 17 to 20, inclusive, are views illustrating the runway and the connecting barrow-ways or boards, all of which will hereinafter be more specifically referred to.

When my improvements are used as outside scaffold-supports, the same are arranged in the manner most clearly shown in Fig. 3 of the drawings, and in such case the main supports, which are in the nature of tubular standards, are formed in sections connected by bayonet or other suitable joints, the upper sections being added to the lower sections A as the building progresses in height. The said lowermost section is mounted in a base-support, comprising swinging foot portions B formed of the lower horizontal members $b$ and the upper horizontal members $b'$, such $b$ and the upper horizontal members $b'$, such members being connected by brace-bars $b^2$ in the manner shown.

The foot portions B are pivotally connected to the lower end of the section A by means of the collars $A'$ $A^2$, shrunk or otherwise secured to such standard, and such collars have apertures $a$ $a'$, in which the pintle ends $b^\times$ of the swinging feet are journaled. Three of such foot portions usually are employed, one of which, $B^\times$, is held from sidewise movement by means of the stop-lugs $a^2$, while the other two are adapted to be swung to close in against the stationary member, as shown in dotted lines in Fig. 10. As a convenient means of holding the said foot portions in position and to provide for their ready attachment or detachment I employ a shifting ring C, formed with a series of peripheral notches $c$, which when brought into register with the apertures $a'$ admit of the insertion of the ends $b^\times$, and when such ring is turned it forms a lock to prevent such ends pulling out of their bearing-apertures. A suitable spring-bolt is used to hold the said ring to its locked position, as shown.

By constructing the standard-support as described the foot members are capable of being adjusted to the different angles desired, and by having one of such members held to a fixed position the standard is held from rotation while it is being placed in position.

The platform-elevating mechanism consists of clutch devices held for reversible movement on the standard A, and such devices, which are most clearly shown in Figs. 5, 6, and 7, comprise a yoke-frame D, formed at its upper and lower ends with integral collars $d$ $d$, which embrace the standard to slide thereon and such collars have apertured annular flanges $d'$ in which the swinging bracket E upon which the mason's platform E' is supported and the bracket F upon which the material or barrow platform $F^\times$ is mounted; such brackets being connected to the apertured flanges in a manner precisely similar to the base or swinging foot members B except that two lock-rings C are employed, whereby the brackets E and F can be used on either end of such yoke-frame when used in reversible positions for a purpose hereinafter explained.

G indicates a rocker-frame pivoted in the yoke-frame D, one end of which is extended and formed with a socket member $g$ adapted to receive the operating-handle $G^\times$, while its opposite end has short pendent arms $g'$ $g'$ pivotally connected at their upper ends to such end $g^2$, in the lower end of which is journaled a rocker-bearing $g^3$, in which is secured the threaded end $h$ of a clutch-ring H, which engages the standard A. Upon the opposite side of its bearing the rocker-frame has longer pendent arms $g^5$ $g^5$ pivoted thereto, in the lower end of which a rocker-bearing $g^4$ is journaled, in which the oppositely-disposed clutch-ring H' is secured.

Each of the rocker-bearings $g^3$ $g^4$ has on its upper face a transverse rod-bearing $g^6$ extended to each side of its axis, to which are connected slidable boxes $i$ secured to the lower ends of coiled springs I I, the upper ends of which are fastened to the yoke-frame, a similarly-arranged additional clutch-ring J being disposed above the rock-frame G.

When the parts are in the position shown in Figs. 5 and 6—i.e., the slidable boxes shifted to a point inside of the axial bearing of the rocker-bearings $g^3$ $g^4$—the clutch-rings will be in a position to alternately clutch and climb up on the standard when the rocker-frame G is operated. When, however, the boxes $i$ are shifted to the outer ends of the rod-bearings, as in Fig. 7, the rings will be in a position to alternately clutch the standard and travel downward thereon. When the parts are in the latter position, it is necessary to provide against the clutch devices slipping on the standard when the platform is loaded. To this end safety friction-clamps are employed, which consist of spring-coils $j'$ held in annular chambers formed in the collars $d$, one end of each of which abut a stop $j$ while the other ends bear against adjusting-screws $j'$, which screws when forced inward serve to expand the coils J' to free them from frictional contact with the standard, but when drawn outward allow for the contraction of such coils, whereby they will bind against the standard and form a very effective brake to hold the clutch devices from slipping on their down movement. The platforms E and F are formed of a number of planks having at their ends seat-blocks $e$ and $f$, which fit over the bracket-supporting arms, and centrally with oppositely-projecting plates $e'$ $f'$, which project under the adjacent edges of the planks which serve to add strength to the platform.

It will be noticed that a central narrow opening is left between the boards of the barrow-platform at each side of the standards. To fill this opening, a narrow plank $f^3$, formed of extensible sections and provided at its ends with yokes $f^4$ having projecting members $f^5$, is employed, such members filling in the top edges of the adjacent boards, such plank $f^3$ being also supported near its center on the plates $e'$ $f'$.

When the standard A has reached a point above the second story, the same is braced by means of what I term a "window-brace," the construction of which is most clearly shown in Figs. 11 and 12 of the drawings, and consists of a tubular bar K, the inner end of which has a semicircular clamp-section $k$, one end of which has a series of apertured ears $k'$, which taper or decrease in diameter from the top to the bottom, and to the opposite edge of such section is hinged a clamp member K', the outer edge of which is also formed with a series of apertured ears $k^2$, decreasing in size from top to bottom, which ears intermesh with the ears $k'$ when the hinged section is closed in, whereby to form a wedge or tapered aperture, in which is adapted to be fitted a tapering bolt $K^2$, elliptical in cross-section and provided with an aperture $k^3$ in its head adapted to receive a suitable turning lever or rod, whereby such bolt can be turned in the tapered aperture to close the hinged clamp member tightly about the standard A. By this construction it will be observed that when the bar K is clamped to the standard A it can be tightly held therein by the wedge or taper bolt $K^2$, the taper of the aperture providing a positive and effective means for such purpose and also preventing the danger of accidental displacement of such bolt.

As projections on the front wall sometimes necessitate that the standard be placed nearer to or farther from such wall I provide the bar K with a telescopic extensible section $K^\times$, which is held to its adjusted positions by the set-screw $k^4$ and slot $k^{\times\times}$. The outer end of the section $K^\times$ has a tubular cross-head L, in the ends of which are fitted telescopic extensible sections, upon the outer ends of which are secured clamp members $L^\times$, which are adapted to project in over the window-sill and clamp the same, such members being braced when used on green walls by the rods $l$, which are secured to the joists, as clearly shown. By providing the cross-head L with extensible sections the same can be readily fitted in windows of different widths. In practice, as the standards pass the different stories these window-braces are employed, although, if desired, the lower ones can be removed and only the upper-story braces used.

In connection with my vertically-adjustable scaffold-supports I employ a vertically-adjustable supplemental platform, such as is termed in builders' parlance a "runway," so as to provide for a convenient way for the barrow-man or hod-carrier. The general arrangement and use of such runway are shown in Fig. 3, the particular construction of which, however, is most clearly shown in Figs. 17 to 20, inclusive. As seen in Fig. 3, it will be noticed that the standard A is held reversed, so as not to project above the top of the platform M and projected down through the joists, the platform proper being supported on the inverted foot members secured to the standard in the manner before described, four of such members being, however, used in this case, as shown. An additional base-section is employed in the arrangement shown, which is provided for by attaching a number of foot members to the clutch devices, which are thereby held rigid, the brake-coils heretofore referred to being in this construction held out of operation and the clutch-rings held to the position shown in Fig. 7, and when in such position their operation will serve to raise the standard with the runway-platform. This platform is constructed of four sections, the two long ones, $m$ $m$, and the short sections, $m'$ $m'$, it being understood, however, that if desired such sections may be of the same size, whereby to form a square platform M instead of rectangular, as shown. The sections $m$ $m$, one of which is shown in detail in Fig. 18, have metal plates $m^2$ $m^2$ on their under sides, which project beyond the inner edges and form supports upon which the sections $m$ $m$ rest, (see Fig. 19,) and such plates $m^2$ have downwardly-extending pins $m^3$, which form guides to fit over the upper bars of the supporting-arms.

The outer edges of each of the sections $m$ $m'$ have rails $m^4$, which form convenient supports to receive the hook-plates $n$ $n$ on the upper ends of the runner-boards N N, which extend from the ground or floor to the platform M, and the lower hook-plates on the boards N', which lead from the platform M to the barrow-platform F, such platform F being provided with hinged portions $F^5$, to which the upper hooked ends $n^2$ of the boards N' are connected. (See Fig. 3.) To provide for the difference in elevation and for a convenient adjustment, the ways N N' are made extensible, and to add strength are braced by the plates $N^×$ $N^×$. By this construction it will be readily seen that the floor-boards N can be attached to the platform M from any side desired and the boards N' projected therefrom in a different direction, and, if desired, two ways N', extended in opposite directions, may be connected to such platform M. It will be also seen that as the scaffold-platform is elevated the platform M can be also elevated, and owing to the extensibility of the boards N N and their peculiar connection with the platforms M and F the same can be quickly adjusted to the positions desired.

In some instances, especially where the material is carried by the hod instead of barrows, I form the upper or barrow platform F of a much less width and support from such platform a hod-carrier platform O, to which the upper boards N' are connected, such construction and arrangement rendering the dump the more easy, as the hod-carrier can throw the material from the shoulder onto the upper platform F, such platform O having suitably-arranged brace-rods $o$, which securely hold it in position. It should be stated, however, that the hod-carrier platform is preferably used only when my devices are used on the inside of a building, as shown in Fig. 2, and when in such use the window-braces before referred to are omitted.

In cases where the piers or projections of a building are of such a nature as to prevent the use of a standard support on the ground, or where it is desired to add additional stories to old buildings, or where it is desired to use window-scaffolds for painting, &c., I arrange my improvements in the manner shown most clearly in Fig. 4, by reference to which it will be seen the window-bracket has its cross-head member $L^5$ pivoted to a cuff-section $l^5$ adjustable on the tubular section $L^6$, whereby such section is capable of being projected diagonally from the window-sill, and such section extends inside the window, as shown at $L^7$.

$L^8$ indicates an extensible bar which fits in the tubular member $L^7$, is adjustably held therein, and has at its outer end a hinged tubular section $L^9$, in which is fitted an adjusting tubular bar $L^{10}$, formed at its lower end with a clamp member $l^{10}$, and $L^{12}$ indicates a second clamp-bar formed with a clamp-foot $l^{12}$, which slides within the tubular bar $L^{10}$.

By referring now more particularly to Fig. 14 it will be noticed that the tubular section $L^9$ and the bar $L^{12}$ have a series of irregular spaced apertures $l^9$ $l^{14}$, while the outer tubular bar $L^{10}$ has a series of regularly-spaced apertures $l^{11}$, the object of which is as follows:

When it is desired to clamp the members $l^{10}$ $l^{12}$ to a joist, it is necessary that such members bear tightly against the upper and under faces of such joists. Such result could not be accomplished were the several apertures in the section $L^9$ and bars $L^{10}$ $L^{12}$ spaced alike. By arranging the apertures as described it will be noticed that when the inner bar $L^{12}$ is moved up to clamp the under edge of the joists at least one of its apertures will come wholly or partly in register with the apertures in the outer bar and the section $L^9$. To cause a still further binding section I provide a lock-pin $L^{15}$, wedge shape in section, flattened, as at $l^×$, which is inserted with its narrow end through the apertures in the sections $L^9$ $L^{10}$ and into the partially-registering aperture in the bar $L^{12}$, after which, by partially rotating such pin and forcing it farther inward, the bar L¹² will be further drawn up, thereby causing a very tight grip against the joist.

By constructing a bracket-support in the manner described ample means are provided for firmly supporting the standard-section A, which in practice is still further supported by additional window-braces as other sections are added to the lowermost section of the standard.

It will also be observed that by constructing the window-brace just described in the manner shown the same is capable of being folded into a small compass, (see Fig. 14ᵃ,) whereby it can be conveniently carried.

From the foregoing description, taken in connection with the drawings, the complete operation and the advantages of my improvements will be readily understood. It will be noticed that several parts are so constructed as to provide for a quick and effective means for setting up the scaffold-supports and for elevating them as the building progresses in height. They can be readily detached and carried from one story to another and when set up will possess the required strength and be secure from the accidents usually incident with the ordinary scaffold-supporting devices.

Having thus described my invention, what I claim, and desire to secure by Letters Patent, is—

1. In a scaffold apparatus substantially as described, in combination, a main post or standard, a base-support for the same, comprising three arms, one of which is fixedly held extending from the main post the others being pivotally connected to such post, and adapted to be folded up in a line parallel with the fixed arms, and locking means for holding the pivotal arms to their adjusted positions, all arranged substantially as shown and for the purposes described.

2. In combination with the standard A, having the fixed apertured collars, of the swinging arms having pintles fitting such apertures and a lock-collar rotatable on the standard and provided with radial notches adapted to be brought into register with the said apertures, whereby to permit of the attachment of the arms, and adapted to be shifted to lock the said arms to their bearings as and for the purpose described.

3. The combination with the standard A, the fixed apertured collars $a$ $a'$, the collar $a$ having lugs $a^2$ $a^2$ of the arms B pivotally joined on the apertured collars and one of such arms fitted between the lugs $a^2$ $a^2$ and held from sidewise movement and means for holding the arms to their adjusted positions, all substantially as shown and described.

4. A builder's scaffold-support comprising a standard or supporting-shaft, clutch mechanism held thereon, including reversible clutch members, whereby they can be adjusted to be movable up or down on such shaft, and brake-clamps adapted to be set to engage the shaft when the clutch members are adjusted for their downward movement, all substantially as and for the purpose described.

5. In a builder's scaffold in combination a main shaft or standard, clutch mechanism mounted thereon, bracket-arms pivotally held thereon, said mechanism including reversible clutch members and coiled spring-clamps encircling the standard and means for holding such clamps to their expanded position, substantially as shown and described.

6. In a builder's scaffold substantially as described, the combination with the standard A, of the lifting mechanism held thereon and comprising a yoke-frame, a rocker-frame mounted therein, pendent arms projected from such rocker-frame on opposite sides of its axis, rocker-bearings held in such pendent arms and the opposite projecting clamp-collars held in such rocker-bearings and springs secured at one end to the yoke-frame and having a shifting connection at their lower ends with the rocker-bearings, substantially as shown and described.

7. In a builder's scaffold substantially as described, the combination with the standard A, of the lifting mechanism, comprising a yoke-frame, a rocker-frame mounted therein having pendent arms at each side of its axis, rocker-bearings in the lower ends of such arms, oppositely-projected clutch-collars held in such rocker-bearings, said bearings having supplemental rod-bearings on their upper face extended to each side of their axis, the coiled springs connected at their upper end to the yoke-frame and having sliding boxes movable on the rod-bearings, substantially as shown and described.

8. In a builder's scaffold, substantially as described, the combination with the standard A, and the window brace-bar, of a clamp on such bar formed of a fixed section having apertured ears, tapered from one end, and a hinged member having apertured tapered ears adapted to intermesh with the fixed ears and a wedge-key adapted to fit said intermeshed apertured ears as and for the purpose described.

9. In combination with the standard A, of the brace-bar L having a fixed clamp member adapted to engage the standard formed with apertured ears of progressively-reduced diameters, a hinged member having similarly-arranged apertured ears adapted to intermesh the fixed ears, and a wedge-key elliptical in cross-section, adapted to fit and be turned in such apertured ears as and for the purpose described.

10. In a builder's scaffold, substantially as described, a brace-bar having a clamp member at one end, for clamping the main support or standard A, a clamp member at its opposite end adapted to clamp the window-sill, such end having an extensible end section, clamping devices for connecting such section to the floor-joists, substantially as and for the purposes described.

11. The combination in a scaffold substantially as described, with the standard A, of a window bracket or brace-bar having a clamp member at its outer end for engaging the standard, a cross-head pivotally connected to such bar, means for securing such cross-head to the window-sill, said brace-bar having an inwardly-projecting section and clamp devices adapted to connect such section to the floor-joists, as and for the purpose described.

12. The combination with the brace-bar having clamp members at its outer end adapted to engage the main standard and clamp members adapted to engage the window, said bar having an inwardly-extending member provided with a tubular hinged portion $L^9$, having a series of irregularly-arranged apertures, a hollow standard $L^{10}$ fitting in such section $L^9$ having a clamp member and a series of regularly-arranged apertures, a rod $L^{12}$ having a series of irregularly-arranged apertures fitting the tubular standard $L^{10}$ and having a clamp portion $l^{12}$ and a wedge-key elliptical in cross-section adapted to lock the members $L^9$ $L^{10}$ and $L^{12}$ to their adjusted positions, all substantially as and for the purposes described.

JOHN E. ENNIS.

Witnesses:
FRED G. DIETERICH,
CHAS. A. PETTIT.